United States Patent
Tanaglia

(12) 
(10) Patent No.: US 6,228,960 B1
(45) Date of Patent: *May 8, 2001

(54) PROCESS FOR THE PREPARATION OF ETHYLENE PROPYLENE COPOLYMERS WITH A LOW CONTENT OF RESIDUAL CHLORINE

(75) Inventor: Tiziano Tanaglia, Bologna (IT)

(73) Assignee: Enichem S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,096

(22) Filed: Sep. 26, 1997

(30) Foreign Application Priority Data

Oct. 8, 1996 (IT) ............... MI96A2069

(51) Int. Cl.$^7$ ....................... C08F 4/68
(52) U.S. Cl. ............... 526/169.2; 526/144
(58) Field of Search ............... 526/144, 169.2

(56) References Cited

U.S. PATENT DOCUMENTS

| | | | |
|---|---|---|---|
| 3,876,595 | * 4/1975 | Ogura et al. | 526/144 |
| 5,191,042 | * 3/1993 | Cozewith | 526/169.2 |
| 5,492,986 | * 2/1996 | Bai | 526/144 |

FOREIGN PATENT DOCUMENTS

| | | |
|---|---|---|
| 2117616 | 10/1971 | (DE) . |
| 0 630 915 | 12/1994 | (EP) . |
| 1 234 738 | 6/1971 | (GB) . |

OTHER PUBLICATIONS

Database WPI, Derwent Publications, AN 72–32320, JP 47 016185, 1972.

Patent Abstracts of Japan, vol. 10, No. 355, Nov. 29, 1986, and Database WPI, Derwent Publications, AN 86–247668, JP 61 155408, Jul. 15, 1986.

\* cited by examiner

Primary Examiner—David W. Wu
Assistant Examiner—R. Rabago
(74) Attorney, Agent, or Firm—Oblon, Spivak, McClelland, Maier & Neustadt, P.C.

(57) ABSTRACT

Process for the preparation of EP(D)M elastomeric copolymers in liquid phase, preferably in suspension of a liquid monomer, in the presence of a catalyst essentially consisting of a Vanadium compound, a cocatalyst essentially consisting of an Aluminium trialkyl, and optionally an activator, characterized in that the Aluminium trialkyl is essentially Aluminium trimethyl and the Vanadium compound, as such or prepolymerized, is selected from:

(a) compounds having general formula (I) $VO(L)_n(X)_m$ wherein n is an integer from 1 to 3 and m is from zero to 2, n+m being equal to 2 or 3;
(b) compounds having general formula (II) $V(L)_p(X)_q$ wherein p is an integer from 1 to 4, q is from 0 to 3, the sum of p+q being equal to 3 or 4; wherein L is a bidentate ligand deriving from a 1,3-diketone and X is a halogen, preferably Chlorine.

9 Claims, No Drawings

PROCESS FOR THE PREPARATION OF ETHYLENE PROPYLENE COPOLYMERS WITH A LOW CONTENT OF RESIDUAL CHLORINE

The present invention relates to a process for the preparation of ethylene propylene (EP) and ethylene-propylene-diene (EPDM) elastomeric copolymers with a low content of residual chlorine.

More specifically the present invention relates to processes for the preparation of EP(D)M in liquid phase (solution or dispersion) preferably in liquid phase in a suspension of monomer.

EP(D)M elastomeric copolymers are at present produced in the presence of catalysts containing inorganic chlorine which at the end of the polymerization remains englobed in the polymer, causing problems of corrosivity of the polymer itself.

This problem is particularly felt in the case of polymerization with a slurry process (suspension of liquid monomer) in which the purification phase of the polymer is not very efficient.

The process in suspension on the other hand is preferable for other reasons such as high productivity, energy saving and reduced environmental impact.

The catalytic system used at present to produce EP(D)M elastomers essentially consists of a Vanadium salt, a chlorinated Aluminium alkyl and an activator.

The presence of chlorinated aluminium alkyl is the cause of most problems of corrosivity; in addition the acidity of the Aluminium compound can lead to undesired cationic reactions on the double bonds of the terpolymers with the consequent formation of cross-linked material and consequently of non-dispersed particles on the surface of the end-products.

Catalytic systems based on Vanadium are known however in which the aluminium compound is in the form of aluminium trialkyl and therefore not corrosive and with reduced Lewis acidity. These catalytic systems are satisfactorily used in the field of polyethylenes, but give EP(D)M with a wide molecular weight distribution.

For example Polymer, 1972, vol.13, July, pages 307–314, describes the reaction rate of $VCl_3+AlR_3$ systems, without chlorinated activators, in relation to the various R (methyl, ethyl, isopropyl). From this study, it can be seen, in table 3, that TMA (trimethylaluminium) is slightly more active than TIBA (triisobutylaluminium) at 30° C., whereas at higher temperatures TMA has a considerably worse productivity than TIBA and TEA (triethylaluminium).

The catalytic system described in U.S. Pat. No. 4,514,514 essentially consists of a compound of Vanadium, a chlorinated activator and an Aluminium alkyl. Table VI of this document shows how TMA gives even lower yields (about half) than TIBA and TEA.

A process has now been found for the preparation of EP(D)M elastomeric copolymers which enables products with a low content of chlorine to be obtained.

In accordance with this, the present invention relates to a process for the preparation of ethylene-propylene (EPM) and ethylene-propylene-diene (EPDM) elastomeric copolymers in liquid phase, preferably in suspension of a liquid monomer, in the presence of a catalyst essentially consisting of a compound of Vanadium, a cocatalyst essentially consisting of an Aluminium trialkyl, and optionally an activator, preferably a chlorinated activator, characterized in that the Aluminium trialkyl is essentially Aluminium trimethyl and the Vanadium compound, as such or prepolymerized, is selected from:

(a) compounds having general formula (I) $VO(L)_n(X)_m$ wherein n is an integer from 1 to 3 and m is from zero to 2, n+m being equal to 2 or 3;

(b) compounds having general formula (II) $V(L)_p(X)_q$ wherein p is an integer from 1 to 4, q is from zero to 3, the sum of p+q being equal to 3 or 4; wherein L is a bidentate ligand deriving from a 1,3-diketone and X is a halogen, preferably Chlorine.

In other words the compound LH, from which the bidentate anion $L^-$ derives from the release of a hydrogen atom, has the general formula $R_1$—CO—$R_2$—CO—$R_3$, wherein $R_1$ and $R_3$ are selected from —H and alkyl radicals, $R_2$ is an alkylene, or $R_1$ and $R_2$ jointly form a 5 or 6 term cycle.

Typical examples of Vanadium salts with bidentate ligands are acetylacetonate, 3-oxobutanalate (otherwise called 2-formylacetonate), 2-acetyl cyclopentanoate, 2-formyl cyclopentanoate (the latter two are described in Italian patent application IT-A-MI 96A 00294), preferably acetylacetonate.

In the preferred embodiment the Vanadium compound has general formula (II), wherein q is zero. Even more preferably the Vanadium compound is Vanadium acetylacetonate.

The above Vanadium compound can be used in the process of the present invention in the form of both solution and dispersion.

When the Vanadium is in the form of a dispersion, it is preferable for the above Vanadium compound to have a particle size of less than 200 microns, preferably less than 30 microns. Mixtures of Vanadium compounds can also be used.

The catalyst and cocatalyst can be fed separately to the polymerization environment, or, preferably, the Vanadium compound can be reacted with an organic compound of Aluminium before being introduced into the polymerization environment, according to the well-known preformation technique. The above organic compound of Aluminium has the general formula $AlR_nX_m$ wherein R is a $C_1$–$C_{20}$ alkyl group, X is halogen, preferably Chlorine, n+m=3. In the preferred embodiment the above organic compound of Aluminium is selected from diethylaluminium chloride (DEAC) and dimethylaluminium chloride.

According to this technique, the interaction between Vanadium compound and organic compound of aluminium is carried out in the presence of ethylene (or ethylene and alpha-olefins) producing a prepolymerized catalytic species insoluble in the practically hydrocarbon reaction environment. The molar ratio between organic compound of aluminium and Vanadium compound is between 1 and 20, preferably from 1.5 to 5.

The reaction time between Vanadium and Al-alkyl in an ethylene atmosphere, is between a few minutes and several hours, generally between 2 minutes and 2 hours, and is also selected in relation to the prepolymerization rate.

The prepolymerization is carried out in such a way that the ratio between grams of prepolymer and grams of Vanadium is between 2 and 150, preferably between 6 and 35, more preferably from 8 to 15. The above treatment can be carried out within a wide temperature range which can vary from −30° C. to 80° C., preferably from 15 to 30° C. The catalytic species thus obtained can be stored and used directly in the form of suspension, as obtained in the above process; alternatively it is possible to filtrate and dry the catalytic precipitate thus obtained, and in this case the catalytic Vanadium compound will be redispersed in the desired solvent. At the end of the prepolymerization process, granules of catalyst covered with a layer of homo or copolymer are obtained. The contact between organic compound of Aluminium and Vanadium compound can be carried out at essentially atmospheric pressure, or under ethylene pressure (or ethylene and alpha-olefin), generally less than 10 atmospheres, preferably at atmospheric pressure.

The process of the present invention comprises the use of TMA (Aluminium trimethyl) as cocatalyst. The molar ratio between the above cocatalyst and Vanadium (intended as compound having general formula (I) or (II) or as prepolymerized compound) is between 3 and 1000, preferably between 9 and 100, even more preferably between 15 and 50.

In the process of the present invention it is preferable to use an activator. These activators usually belong to the group of chlorinated organic compounds, for example ethyl trichloroacetate, n-butyl perchlorocrotonate, diethyl dichloromalonate, carbon tetrachloride, chloroform. The molar ratio between activator and Vanadium can vary from 0/1 to 1000/1, preferably from 0.5/1 to 40/1, even more preferably from 1/1 to 10/1.

The polymerization process of the present invention is carried out in liquid phase, preferably in a reaction medium in which the polymer is substantially insoluble. In the preferred embodiment the reaction medium prevalently consists of one of the comonomers, to which a saturated hydrocarbon, such as propane, butane, pentane, hexane, is optionally added as diluent, or relative mixtures with aromatic hydrocarbons. In the preferred embodiment the diluent essentially consists of propane.

The polymerization temperature is maintained at between $-5°$ C. and $65°$ C., preferably from $25°$ C. to $50°$ C. The contact times vary from 10 minutes to 6 hours, preferably from 15 minutes to 1 hour.

The polymerization is preferably carried out with hydrogen as moderator and molecular weight regulator, operating at a total pressure of between 5 and 100 bars, preferably from 8 to 30 bars, with a ratio between partial ethylene pressure and partial hydrogen pressure of more than 4, preferably more than 20. Other compounds however can be used as molecular weight regulators, for example diethylzinc.

The elastomeric copolymers which can be obtained with the process of the present invention contain from 35% to 85% by weight of ethylene, preferably from 45% to 75% by weight, and have an intrinsic viscosity, measured at $135°$ C. in o-dichlorobenzene, of between 0.5 and 6 dl/g, preferably from 1 to 3 dl/g. The above ethylene-propylene elastomeric copolymers can also contain higher alpha-olefins, generally in a quantity of not more than 20% by weight, usually less than 10%. The term higher alpha-olefins refers to alpha-olefins having from 4 to 10 carbon atoms, for example butene-1, pentene-1, hexene-1.

As is known to experts in the field, ethylene and propylene can be copolymerized with non-conjugated dienes to give (EPDM) elastomeric terpolymers. These termonomers can be selected from:
dienes with a linear chain such as 1,4-hexadiene and 1,6-octadiene;
acyclic dienes with a branched chain such as 5-methyl-1,4-hexadiene; 3,7-dimethyl-1,6-octadiene; 3,7-dimethyl-1,7-octadiene;
alicyclic dienes with a single ring such as 1,4-cyclohexadiene; 1,5-cyclooctadiene; 1,5-cyclododecadiene;
dienes having fused and bridged alicyclic rings, such as methyltetrahydroindene; dicyclopentadiene; bicyclo [2.2.1] hepta-2,5-2,5-diene; alkenyl, alkylidene, cycloalkenyl, and cycloalkylidene norbornenes such as 5-methylene-2-norbornene; 5-ethylidene-2-norbornene (ENB); 5-propenyl-2-norbornene.

The above non-conjugated dienes can be present in a maximum quantity of 20% by weight, preferably 12% by weight.

Under the same conditions, the process of the present invention allows the production of copolymers and terpolymers with a low content of chlorine and narrow molecular weight distribution. In addition the productivity is higher than the catalytic systems used in the prior art.

The process of the present invention can also be carried out in the presence of solid particles, for example carbon-black or silica, to improve the recovery of the elastomer thus produced, as described in the Italian patent application filed by the same applicant IT-A-MI 95A 02499.

The following examples provide a better understanding of the present invention.

EXAMPLES

The examples refer to tests carried out in the laboratory with 3 liter reactors operating batchwise.

All the reagents are commercial products; the solvents and liquid activators were deaerated under nitrogen and anhydrified on alumina or molecular sieves.

The copolymers obtained were thus characterized:

Composition and reactivity ratio: these were determined by infra-red analysis of the polymer in the form of a film having a thickness of 0.2 mm using a Perkin Elmer FTIR spectrophotometer model 1760; the propylene content was determined by measuring the ratio between the absorbances of the bands at 4390 and 4255 cm$^{-1}$ and using a calibration curve calibrated with standard polymers.

Mooney Viscosity ML(1+4): this was determined at 100 and $125°$ C. according to ASTM D 1646-87.

Molecular weight distribution (Mw/Mn): this was determined by gel permeation chromatography technique, in 1,2-dichlorobenzene, using PL-GEL® (produced by Polymer Lab) as stationary phase with particles of 10 $\mu$m and a porosity of $10^2$, $10^3$, $10^4$, $10^5$ nm, respectively. The calculation of the molecular weights was corrected in relation to the average composition of the polymer according to the equation proposed by Sholte.

The melting heat correlated to the crystallinity of the polymers was determined by DSC with a Perkin-Elmer DDC 7 instrument in an inert atmosphere and with a scanning velocity of $20°$ C./minute; the crystallinity datum was obtained by relating the melting heat of the polymer to the melting heat of the polyethylene estimated at 286 J7g.

The intrinsic viscosity was determined in 1,2-dichloroethane at $135°$ C.

The catalyst used in the experimental examples is a catalyst prepared according to the method indicated in Italian patent application 95 IT-MI 1403 filed by the same applicant, according to what is described in example 10 of the above patent application. According to this technique the catalytic system is prepared by mixing, in an atmosphere of ethylene (or ethylene and alpha-olefin), Vanadium (III) acetylacetonate suspended in paraffinic oil and an essentially hydrocarbon solution of DEAC (diethylaluminium chloride). The solid thus obtained is used as catalytic system.

Comparative Example 1

1905 ml of liquid propylene are charged into a perfectly anhydrous 2.8 dm$^3$ pressure-resistant reactor equipped with a propeller stirrer.

The reactor is thermostat-regulated at 40° C., saturated with ethylene until an overpressure is reached of 4.55 bars; a further overpressure of 0.2 bars of hydrogen was then added. The pressure in the top of the reactor was 20.1 bars.

A hexane solution containing 3.53 mmoles of TIBA (triisobutylaluminium) and subsequently an amount of the catalyst containing 0.059 mmoles of vanadium suspended in hexane and 1.76 mmoles of $CCl_4$ (Al/V=60 molar; $CCl_4$/V=30 molar), are then charged into the reactor.

The reaction is carried out for 60 minutes at a constant temperature feeding ethylene in continuous to maintain the total pressure constant. At the end of this period the reactor was opened and 136 grams of polymer were recovered.

The relevant characteristics are shown in table 1.

Example 2

1845 ml of liquid propylene are charged into the perfectly anhydrous 2.8 dm³ pressure-resistant reactor described in example 1. The reactor is thermostat-regulated at 40° C. and saturated with ethylene until an overpressure is reached of 6.1 bars; a further overpressure of 0.2 bars of hydrogen is then added.

The total pressure in the top of the reactor was 21.7 bars.

A hexane solution containing 3.28 mmoles of TMA and subsequently an aliquot of the catalyst containing 0.055 mmoles of Vanadium suspended in hexane and 1.38 mmoles of $CCl_4$ (Al/V=60 molar; $CCl_4$/V=25 molar), are then charged into the reactor.

The reaction is carried out for 60 minutes at a constant temperature feeding ethylene in continuous to maintain the total pressure constant. At the end of this period the reactor was opened and 192 grams of polymer were recovered.

The relevant characteristics are shown in table 1.

Comparative Example 3

1826 ml of liquid propylene are charged into the perfectly anhydrous pressure-resistant reactor described above. The reactor is thermostat-regulated at 50° C. and saturated with ethylene until an overpressure is reached of 5.04 bars; a further overpressure of 0.2 bars of hydrogen is then added.

The total pressure in the top of the reactor was 24.7 bars.

A hexane solution containing 2.34 mmoles of TIBA and subsequently an amount of the catalyst containing 0.039 mmoles of Vanadium suspended in hexane and 0.98 mmoles of $CCl_4$ (Al/V=60 molar; $CCl_4$/V=25 molar), are then charged into the reactor.

The reaction is carried out for 60 minutes at a constant temperature feeding ethylene in continuous to maintain the total pressure constant. At the end of this period the reactor was opened and 110 grams of polymer were recovered.

The relevant characteristics are shown in table 1.

Example 4

1744 ml of liquid propylene are charged into the perfectly anhydrous pressure-resistant reactor described above. The reactor is thermostat-regulated at 50° C. and saturated with ethylene until an overpressure is reached of 7.3 bars; a further overpressure of 0.2 bars of hydrogen is then added.

The total pressure in the top of the reactor was 27 bars.

A hexane solution containing 2.34 mmoles of TMA and subsequently an amount of the catalyst containing 0.039 mmoles of Vanadium suspended in hexane and 0.98 mmoles of $CCl_4$ (Al/V=60 molar; $CCl_4$/V=25 molar), are then charged into the reactor.

The reaction is carried out for 60 minutes at a constant temperature feeding ethylene in continuous to maintain the total pressure constant. At the end of this period the reactor was opened and 256 grams of polymer were recovered.

The relevant characteristics are shown in table 1.

Comparative Example 5

840 ml of liquid propylene and 904 ml of liquid propane are charged into the perfectly anhydrous pressure-resistant reactor described above. The reactor is thermostat-regulated at 60° C. and saturated with ethylene until an overpressure is reached of 2.72 bars.

The total pressure in the top of the reactor was 25 bars.

A hexane solution containing 2.34 mmoles of TIBA and subsequently an aliquot of the catalyst containing 0.039 mmoles of Vanadium suspended in hexane and 0.98 mmoles of $CCl_4$ (Al/V=60 molar; $CCl_4$/V=25 molar), are then charged into the reactor.

The reaction is carried out for 60 minutes at a constant temperature feeding ethylene in continuous to maintain the total pressure constant. At the end of this period the reactor was opened and 60 grams of polymer were recovered.

The relevant characteristics are shown in table 1.

Example 6

749 ml of liquid propylene and 903 ml of liquid propane are charged into the perfectly anhydrous pressure-resistant reactor described above. The reactor is thermostat-regulated at 60° C. and saturated with ethylene until an overpressure is reached of 26.6 bars.

The total pressure in the top of the reactor was 26.6 bars.

A hexane solution containing 2.34 mmoles of TMA and subsequently an aliquot of the catalyst containing 0.039 mmoles of Vanadium suspended in hexane and 0.98 mmoles of $CCl_4$ (Al/V=60 molar; $CCl_4$/V=25 molar), are then charged into the reactor.

The reaction was only carried out for 20 minutes as it was not possible to keep the temperature constant, feeding ethylene in continuous to maintain the total pressure constant. At the end of this period the reactor was opened and 186 grams of polymer were recovered.

The relevant characteristics are shown in table 1.

Example 7

749 ml of liquid propylene and 903 ml of liquid propane are charged into the perfectly anhydrous pressure-resistant reactor described above. The reactor is thermostat-regulated at 60° C. and saturated with ethylene until an overpressure is reached of 4.26 bars.

The total pressure in the top of the reactor was 26.6 bars.

A hexane solution containing 0.67 mmoles of TMA and subsequently an aliquot of the catalyst containing 0.0195 mmoles of Vanadium suspended in hexane and 0.49 mmoles of $CCl_4$ (Al/V=60 molar; $CCl_4$/V=25 molar), are then charged into the reactor.

The reaction was only carried out for 30 minutes as it was not possible to keep the temperature constant, feeding ethylene in continuous to maintain the total pressure constant. At the end of this period the reactor was opened and 198 grams of polymer were recovered.

The relevant characteristics are shown in table 1.

Comparative Example 8

1710 ml of liquid propylene are charged into the perfectly anhydrous pressure-resistant reactor described above. The reactor is thermostat-regulated at 50° C. and saturated with ethylene until an overpressure is reached of 5.04 bars; a further overpressure of 0.3 bars of hydrogen is then added.

The total pressure in the top of the reactor was 25.0 bars.

A hexane solution containing 2.22 mmoles of TIBA and subsequently an aliquot of the catalyst containing 0.0404 mmoles of Vanadium suspended in hexane and 2.22 mmoles of $CCl_4$ (Al/V=55 molar; $CCl_4$/V=55 molar), are then charged into the reactor.

The reaction is carried out for 60 minutes at a constant temperature feeding ethylene in continuous to maintain the total pressure constant. At the end of this period the reactor was opened and 240 grams of polymer were recovered.

The relevant characteristics are shown in table 1.

TABLE 1

| Ex. | Temp. | Propylene % | Yield kg/gV | ML 1 + 4 125° C. | MWD Mw/Mn | Cryst. % | Chlorine (ppm) |
|---|---|---|---|---|---|---|---|
| 1c | 40 | 31.8 | 45.3 | 40 | 146.9 | 7.2 | |
| 2 | 40 | 37.2 | 68.5 | 40 | 17.5 | 3.8 | |
| 3c | 50 | 32.6 | 55 | 35 | 60.1 | 7.5 | 385 |
| 4 | 50 | 36.3 | 128 | 47 | 15.4 | 3.3 | <100 |
| 5c | 60 | 30.2 | 30 | 46 | | 8.4 | 160 |
| 6 | 60 | 31 | 93* | 50 | 2.9 | 5.2 | <100 |
| 7 | 60 | 33.9 | 198** | | 2.8 | 2.7 | <100 |
| 8c | 50 | 33.9 | 116.5 | 56 | 83.2 | 4.5 | |

*in 20 minutes;
**in 30 minutes.

The data of table 1 show how the process of the present invention enables to improve, contrary to what is described in the prior art, the catalytic yields and consequently to produce with a lower content of residual chlorine.

The difference in yield, already distinct at 40° C., becomes enormous at 60° C. It should also be noted that the reaction of examples 6 and 7 was interrupted after 20 and 30 minutes respectively.

In addition the elastomers obtained according to the process of the present invention are all characterized by a much better molecular weight distribution and crystallinity with respect to the comparative examples. This indicates a better applicability as elastomers of the products with a low chlorine content which can be obtained with the process of the present invention.

What is claimed is:

1. A process for the preparation of an ethylene-propylene (EPM) or an ethylene-propylene-diene (EPDM) elastomeric copolymer in liquid phase, comprising preparing said EPM or EPDM in the presence of;
   (a) a catalyst consisting essentially of:
      a compound of vanadium having formula (II)

$$V(L)_p \qquad (II)$$

wherein p is 3 or 4, and L is a bidentate ligand derived from a 1,3-diketone,
      a cocatalyst of trimethyl aluminum, and
      a prepolymer of ethylene, propylene or a mixture thereof; and
   (b) optionally an activator;
   wherein said catalyst is insoluble in the reaction environment, and wherein said catalyst is a suspension obtained by mixing, in an atmosphere of ethylene, propylene or a mixture thereof said compound of vanadium having formula (II) and a hydrocarbon solution of trimethyl aluminum.

2. The process according to claim 1, wherein the activator is a chlorinated organic compound.

3. The process according to claim 1, wherein the molar ratio between the cocatalyst and the Vanadium is between 3 and 1000.

4. The process according to claim 3, wherein the molar ratio between cocatalyst and Vanadium is between 9 and 100.

5. The process according to claim 4, wherein the molar ratio between cocatalyst and Vanadium is between 15 and 50.

6. The process according to claim 1, wherein said process is carried out in the presence of a chlorinated activator, wherein the molar ratio between chlorinated activator and Vanadium being from 0.5/1 to 40/1.

7. The process according to claim 6, characterized in that the molar ratio between chlorinated activator and Vanadium is from 1/1 to 10/1.

8. The process according to claim 1, characterized in that the compound of Vanadium is Vanadium acetylacetonate.

9. The process of claim 1, wherein said copolymer is prepared in suspension of a liquid monomer.

* * * * *